United States Patent
Feng et al.

(10) Patent No.: US 12,470,619 B2
(45) Date of Patent: Nov. 11, 2025

(54) EXTENSIBLE METHOD TO DECOUPLE API AND SERVICE PROVIDER

(71) Applicant: SAP SE, Walldorf (DE)

(72) Inventors: Chen Feng, Shanghai (CN); Xiansheng Sun, Shanghai (CN); Xia Yu, Shanghai (CN); Kun Liu, Shanghai (CN); Shuna Ye, Shanghai (CN)

(73) Assignee: SAP SE, Walldorf (DE)

( * ) Notice: Subject to any disclaimer, the term of this patent is extended or adjusted under 35 U.S.C. 154(b) by 22 days.

(21) Appl. No.: 18/535,070

(22) Filed: Dec. 11, 2023

(65) Prior Publication Data

US 2025/0193269 A1    Jun. 12, 2025

(51) Int. Cl.
*G06F 9/54*       (2006.01)
*H04L 67/025*     (2022.01)

(52) U.S. Cl.
CPC .......... *H04L 67/025* (2013.01); *G06F 9/541* (2013.01); *G06F 9/547* (2013.01)

(58) Field of Classification Search
CPC .... H04L 67/025; H04L 12/2818; G06F 9/541
See application file for complete search history.

(56) References Cited

U.S. PATENT DOCUMENTS

| 2017/0155689 | A1* | 6/2017 | Blencowe | ............. | H04M 3/493 |
| 2022/0365832 | A1* | 11/2022 | Feng | ....................... | G06F 9/547 |
| 2024/0004973 | A1* | 1/2024 | Bosch | ..................... | G06F 21/31 |

* cited by examiner

*Primary Examiner* — Tonia L Dollinger
*Assistant Examiner* — Joseph M Cousins
(74) *Attorney, Agent, or Firm* — Buckley, Maschoff & Talwalkar LLC (57) ABSTRACT

A system associated with an enterprise microservice cloud computing environment may include a central API registry that contains API URL pattern-to-application mapping. A routing rule processor of an API gateway, coupled to the central API registry, may receive a first request (including a first request API URL) for a first user API call. Based on the first request API URL, the central API registry may be queried to determine an associated first application instance. The first request may then be routed to the first application instance to process the first user API call. A second request for a second user API call, including a second request API URL may be received. Based on the second request API URL, the central API registry may be queried to determine an associated second application instance, and the second request may be routed to the second application instance.

15 Claims, 13 Drawing Sheets

```
{
    "api": "rest /v1/UserProfile",
    "serviceName": "bff-svc",
    "rateLimiting": {
        "default": {
            "quota": {
                "count": 7000,
                "interval": 1,
                "timeUnit": "day"
            },
            "spikeArrest": {
                "rate": "50ps"
            }
        }
    },                                                          ⎫
                                                                ⎬ 910
    "isAnonymousAPI": true,                                     ⎭
    "CORS": {  ⎯ 920
        "Access-Control-Allow-Origin": "<origin>",
        "Access-Control-Allow-Methods": "GET,PUT,POST,DELETE,HEAD,OPTIONS",
        "Access-Control-Allow-Headers": "x-csrf-token,x-sap-cid,content-type,authorization,accept,x-request-with,accept-encoding,accept-language,access-control-request-headers,access-control-request-method,cache-control,connection,host,origin,pragma,referer,user-agent,application-id",
        "Access-Control-Allow-Credentials": true,
        "Access-Control-Expose-Headers": "x-csrf-token,x-sap-cid,content-type,authorization,accept,x-request-with,Access-Control-Allow-Origin,Access-Control-Allow-Credentials",
        "Access-Control-Max-Age": 3600
    }
}
```
— 900

EXTENSIBLE METHOD TO DECOUPLE API AND SERVICE PROVIDER

BACKGROUND

An enterprise may utilize a microservice cloud computing environment to let users perform tasks. For example, the enterprise might let various users execute applications or services in the computing environment to process purchase orders, adjust human resources information, generate invoices, etc. Companies are increasingly migrating older monolith applications to such microservices as part of an ongoing cloud transformation. Appropriate Application Programming Interface ("API") management (e.g., associated with how computer programs communicate with each other) is a very important aspect of such migrations.

Note that a migration to the cloud can be difficult because of routing changes. For example, API management rules may be tightly coupled to a specific API gateway implementation. As a result, reimplementation of entire gateway functions may be required when switching to a different gateway product (e.g., from APIGEE™ to KONG™) because each gateway has a different routing implementation. Similarly, reimplementation of routing may be required in an API gateway to switch from monolith to microservice using a strangler pattern (e.g., when an old system is put behind an intermediary facade and, over time, external replacement services for the old system are added behind the facade). For example, after the migration the original request routing to the monolith application needs to go to the new microservice (requiring substantial changes to support the new routing rule). In addition, API configurations may be spread across many locations which can be hard to maintain in a large enterprise application (this is a general problem associated with API management). It can be especially difficult during a migration because all of these configurations need to be updated. Note that many features, such as Cross-Origin Resource Sharing ("CORS"), rate-limiting, and API mashups, are not generally centralized at a single location.

It would therefore be desirable to provide an API registry and a routing rule processor for an enterprise microservice cloud computing environment in a secure, automatic, and efficient manner.

SUMMARY

According to some embodiments, methods and systems associated with an enterprise microservice cloud computing environment may include an API registry that contains URL pattern-to-application mapping. A routing rule processor of an API gateway, coupled to the central API registry, may receive a first request (including a first request API URL) for a first user API call. Based on the first request API URL, the central API registry may be queried to determine an associated first application instance. The first request may then be routed to the first application instance to process the first user API call. A second request for a second user API call, including a second request API URL may be received. Based on the second request API URL, the central API registry may be queried to determine an associated second application instance, and the second request may be routed to the second application instance.

Some embodiments comprise: means for receiving, at a computer processor of a routing rule processor of an API gateway, a first request for a first user API call, the first request including a first request API URL; based on the received first request API URL, means for querying a central API registry to determine an associated first application instance to process the first user API call, wherein the central API registry contains API URL pattern-to-application mapping; means for routing at least a first portion of the first request to the first application instance to handle the user API call; means for receiving a second request for a second user API call, the second request including a second request API URL; based on the received second request API URL, means for querying the central API registry to determine an associated second application instance to process the second user API call; and means for routing at least a second portion of the second request to the second application instance to process the second user API call.

Some technical advantages of some embodiments disclosed herein are improved systems and methods to provide an API registry and a routing rule processor for an enterprise microservice cloud computing environment in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein provide a new way to manage API routing rules and centralize system configuration. A highly extensible API registry may abstract API request routing rules (and even API metadata) from concrete service provider implementations including an API gateway, an API client, etc. In some embodiments, an API URL pattern-to-application/service mapping and other routing rules may be defined in this structured API registry. Because the API registry is maintained centralized and accessible by different applications and services in a distributed system, it may help provide transparent API migration from a monolithic application to microservices.

Figure 1:
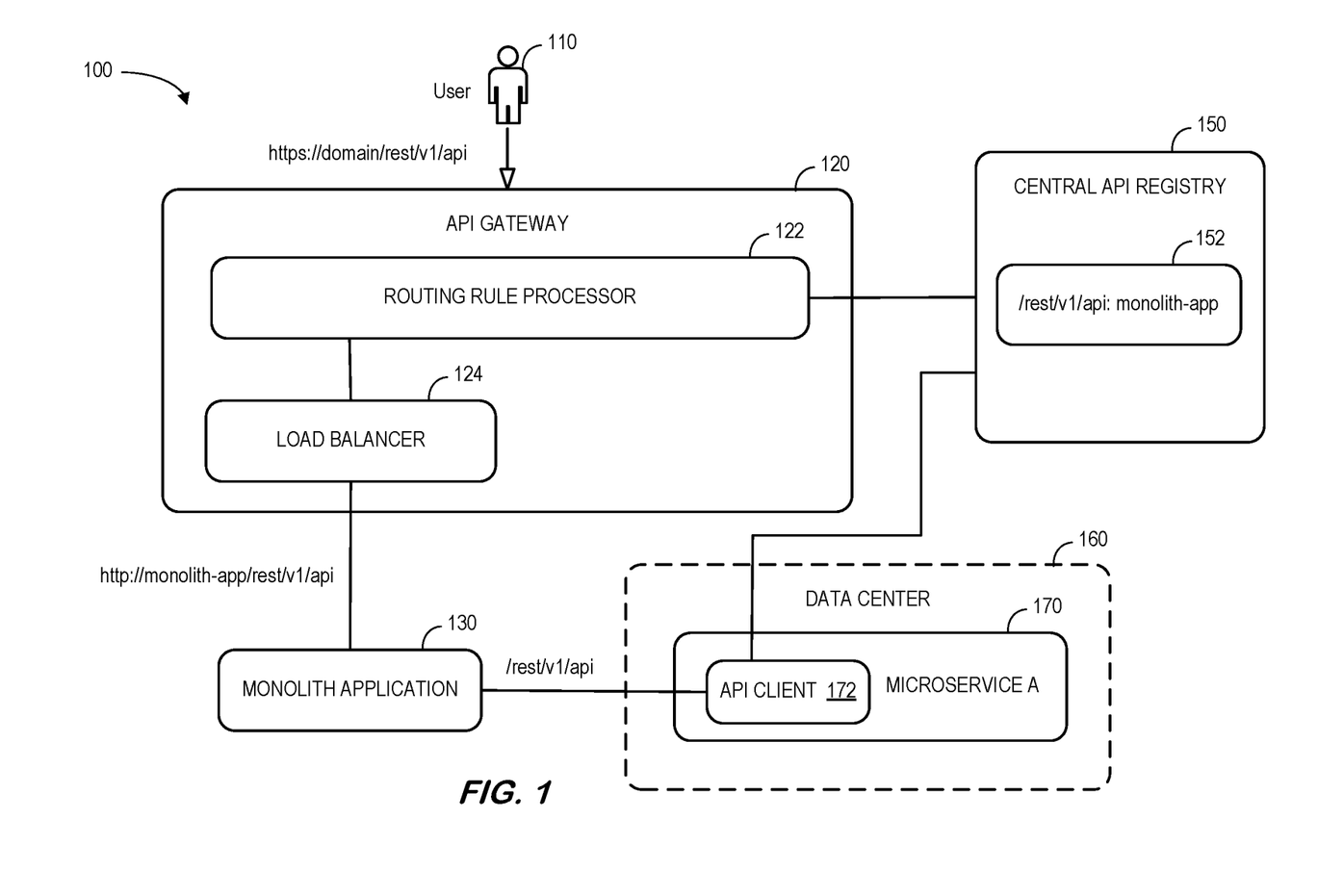
FIG. 1 is a high-level system hybrid architecture showing a monolith application prior to migration in accordance with some embodiments.

For example, FIG. 1 is a high-level system 100 hybrid architecture showing a monolith application 130 prior to migration to a microservice in accordance with some embodiments. A monolith application 130 may comprise a collection of hardware, software, and data storage that is self-contained and built to perform relatively larger and more complex tasks alone. In many instances, a monolith application 130 may include a user-interface, the code to perform the task, and the memory to store relevant data. A user 110 may provide an API call to an API gateway 120 with the intention of having the monolith application 130 perform one or more tasks, and possibly return results, to the user 110. As used herein, the phrase "API gateway" may refer to a data-plane entry point for API calls that represent client or user 110 requests to target applications and services. The API gateway 120 may, for example, perform request processing based on defined policies, including authentication, authorization, access control, Secure Sockets Layer ("SSL")/Transport Layer Security ("TLS") offloading, routing, etc. To perform these functions, the API gateway 120 may include a routing rule processor 122 and a load balancer 124. The load balancer 124 may help decide which service instance to be invoked in case of multiple instances. The routing rule processor 122 may access a central API registry 150 that contains API Uniform Resource Locator ("URL") pattern-to-application mapping 152. According to some embodiments, a microservice 170 ("Microservice A" including an API client 172) at a data center 160 also accesses the central API registry 150. In general, a microservice 170 comprises self-contained code designed to perform a single, generally smaller and simpler task, as compared to a monolith application 130. According to some embodiments, a remote operator or administrator device may be used to configure or otherwise adjust the system 100.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The routing rule processor 122 may store information into and/or retrieve information from various data stores (e.g., the API registry 150), which may be locally stored or reside remotely from the routing rule processor 122. Although a single routing rule processor 122 is shown in FIG. 1, any number of such devices may be included. Moreover, various devices described herein might be combined according to embodiments of the present invention. For example, in some embodiments, the API registry 150 and the routing rule processor 122 might comprise a single apparatus. The system 100 functions may be performed by a constellation of networked apparatuses, such as in a distributed processing or cloud-based architecture.

The user 110 may access the system 100 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify how the user 110 interacts with the enterprise microservice cloud computing environment) and/or provide or receive automatically generated recommendations, alerts, or results associated with the system 100.

Prior to migration of the monolith application 130 to microservices at the data center 160, the system may provide a set of Representational State Transfer ("REST") APIs for external customer integration, such as "/rest/v1/api". When the user 110 makes an API call to "https://<domain>/rest/v1/api" (e.g., from a web browser or mobile interface), the API call will typically be received by the API gateway 120. The API gateway 120 will query the central API registry 150, which is maintained in a centralized configuration store, and find that API "/rest/v1/api" is in the associated monolith application 130. In other words, the pattern-to-application mapping 152 uses a data store to correlate the pattern in the received API call (e.g., "rest/v1/api") to the monolith application 130 where this application is executed. In some implementations, the pattern-to-application mapping 152 may include a parser and use character recognition to divide the received user 110 request into constituent parts (e.g., use the "/" character as a place to divide the request). The API gateway 120 can then route and load balance 124 the request to one of the monolith application 130 instances (such user 110 to monolith 130 situations can be referred to as a "north-south" integration use cases). Once execution of the requested task is completed by the monolith application 130, a result may be returned to the user 110.

In some instances, the migration of applications from monolith applications 130 to microservices 170 occurs as a piecemeal undertaking. In these circumstances, a microservice 170 may rely on a monolith application 130 to perform a sub-task (e.g., obtain pricing for an invoice) before the microservice 170 can complete the remaining portions of the task (e.g., generate the invoice). In this microservice 170 to monolith application 130 (sometimes referred to as an east-west integration) use case another application or service (e.g., microservice A 170) can leverage the central API registry 150 to look up the target service of "/rest/v1/api". With a generalized API client implementation 172 in microservice 170, code implementation of microservice A 170 does not require API code or even need to know where the API associated with monolith application 130 is located. In this way, not all applications need to be migrated away from a monolith architecture to a microservices architecture at one time, so that the migration of "/rest/v1/api" from the monolith application 130 to a microservice can occur at a later time while not impacting observed functionality from the perspective of user 110.

Figure 2:
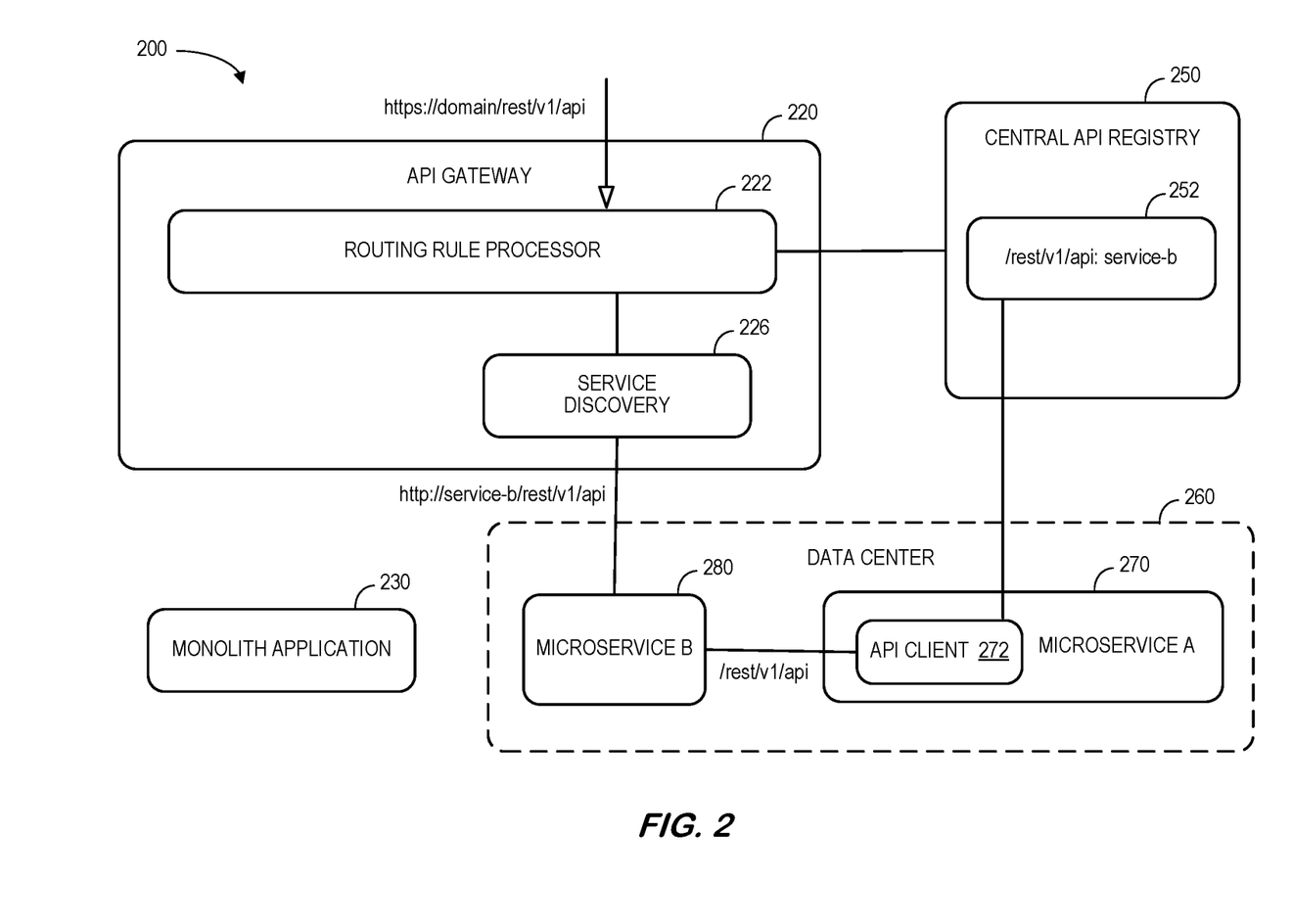
FIG. 2 is a system after migration according to some embodiments.

FIG. 2 is a high-level system 200 architecture showing a monolith application 230 after migration in accordance with some embodiments. As before, a user may provide an API call to an API gateway 220. The API gateway 220 may, for example, include a routing rule processor 222 and service discovery 226. The service discovery 226 may, for example, help locate a particular service in the system 200. The routing rule processor 222 may access a central API registry 250 that contains API URL pattern-to-application mapping 252. According to some embodiments, a microservice 270 ("Microservice A" including an API client 272) at a data center 260 also accesses the central API registry 250 in order to make requests of microservice B 280 instead of monolith application 230 as was described with respect to FIG. 1. In this example, the monolith application 230 has migrated to microservice B 280 at the data center 260 (that is, the API "/rest/v1/api" is in microservice B 280).

Figure 3:
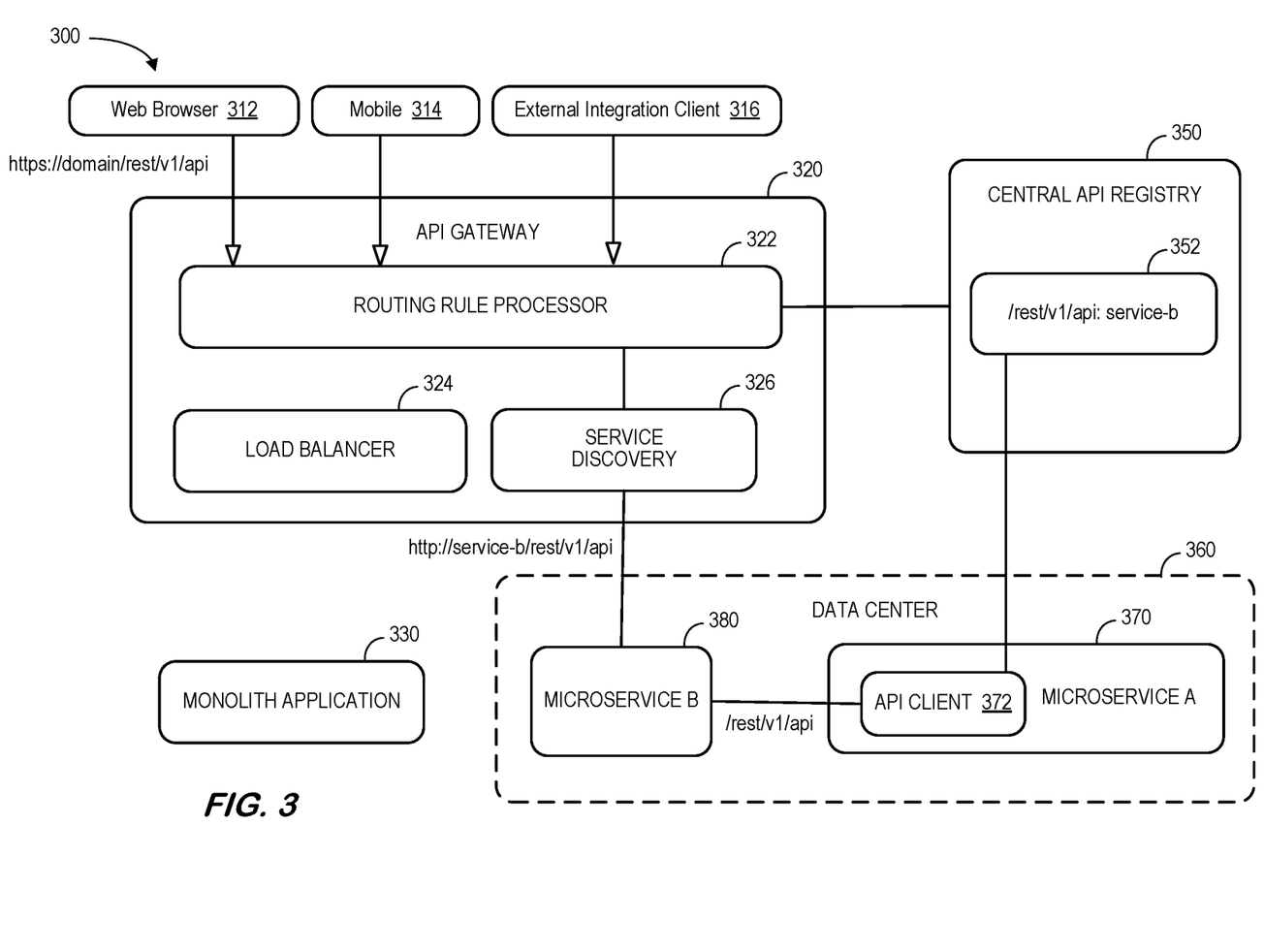
FIG. 3 is a more detailed system in accordance with some embodiments.

FIG. 3 is a more detailed system 300 in accordance with some embodiments. A user may provide an API call to an API gateway 320 via a web browser 312, a mobile interface 314, or any other external integration client 316. The API gateway 320 may, for example, include a routing rule processor 322, a load balancer 324, and service discovery 326. The routing rule processor 322 may access a central API registry 350 that contains API URL pattern-to-application mapping 352. According to some embodiments, a microservice 370 ("Microservice A" including an API client 372) at a data center 360 also accesses the central API registry 350. In this example, the monolith application 330 has migrated to microservice B 380 at the data center 360 (that is, the API "/rest/v1/api" is in microservice B 380).

Figure 4:
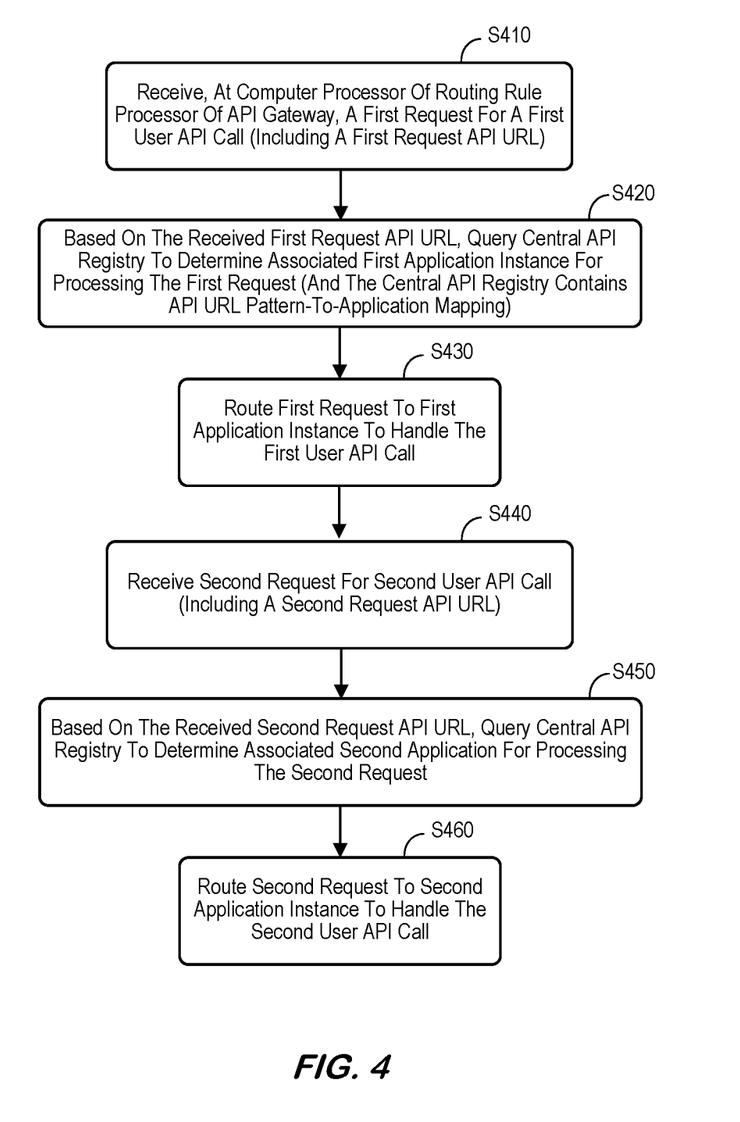
FIG. 4 is an external call-to-target service (north-south integration) method according to some embodiments.

FIG. 4 is an external call-to-target service (north-south integration use case) method according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a computer processor of a routing rule processor of an API gateway may receive a first request for a first user API call. The first request may include, for example, a first request API URL. The first request API URL may be received, in some embodiments, via a web browser, a mobile interface, an external integration client, etc. Based on the received first request API URL, at S420 the system may query a central API registry to determine an associated first application instance for the first request. The central API registry may contain, according to some embodiments, URL pattern-to-application mapping. Note that the first application instance for the first request might comprise a monolith application or a microservice at a data center. Moreover, according to some embodiments, the central API registry may further store information about API metadata, load balancer information (e.g., rules or mappings), service discovery information (e.g., to help locate services), etc. At S430, the system may then route the first request (or at least a first portion of the first request) to the first application instance to process the first the user API call.

Similarly, at S440 the routing rule processor may receive a second request for a second user API call. The second request may include, for example, a second request API URL. Based on the received second request API URL, at S450 the system may query the central API registry to determine an associated second application instance for the second request. The second application instance for the second request might comprise a monolith application or a microservice at a data center. At S460, the system may then route the second request (or at least a second portion of the second) to the second application instance to process the second the user API call.

Note that various embodiments may support different system configurations. For example, the first and second application instances might be associated with the same application and comprise monolithic application instances. As another example, the first and second application instances might be associated with the same application, and the first application instance might comprise a monolithic application instance while and the second application instance comprises a microservice instance. Note that the first request may occur at a first time while the second request occurs at a second time (and the second time is after the first time). As still another example, the first and second application instances might be associated with the same application, and both may comprise microservice application instances. In some embodiments, the first request is from a user and the second request is from a microservice application instance. Moreover, in a mashup environment, based on the received first request API URL the system may query the central API registry to determine an associated third application instance. In this case, the system may then route at least a third portion of the first request API URL to the third application instance.

Referring again to FIG. 3, in the north-south traffic use case, when the external API call "https://domain/rest/v1/api" reaches the API gateway 320 the central API registry 350 is accessed. According to the updated mapping information 352 in the central API registry 350, the target service becomes "service-b." As a result, the request is routed to microservice B 380 with some service discovery 326 mechanisms. That is, the customer API call (from whatever client) does not require any changes as a result of the migration.

Figure 5:
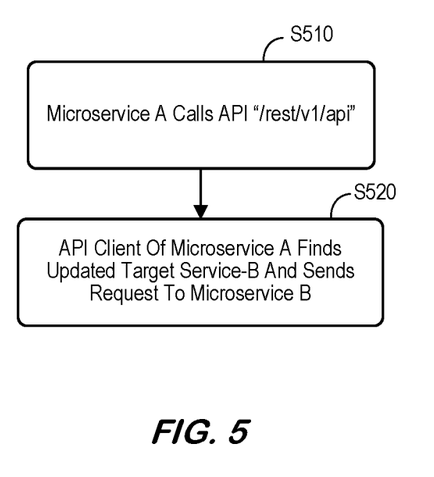
FIG. 5 is a microservice-to-target service (east-west integration) method in accordance with some embodiments.

According to some embodiments, microservices in the data center 360 also leverage the mapping 352 in the central API registry 350. FIG. 5 is a microservice-to-target service (east-west integration use case) method in accordance with some embodiments. In the east-west integration use cases, when microservice A 370 calls the same API "/rest/v1/api" at S510, the API client 372 will find updated target service-b from pattern-to-application mapping 352 and send the request to microservice B 380 at S520. This change is transparent to the API consumer microservice A 370. That is, no code changes and redeployment are required for the API consumers.

With this abstraction, adding new APIs (or updating existing APIs) does not require code changes in the API gateway 320 or the API client 372 if they have a generic implementation that respects the rules and definitions in the central API registry 350. Even if there are changes of a technical choice in the API gateway 320 layer (e.g., a change from one gateway product to another), the critical information in central API registry 350 can still be reused. As a result, substantial development efforts may be reduced.

In some embodiments, the central API registry 350 is extensible. For example, the central API registry might be used for request routing with the following configuration:

```
{
  "api": "rest/user/v1/UserProfile",
  "serviceName": "user-svc"
}
```

The "serviceName" might be associated with a microservice or a monolith such as "monolith-app." Based on this configuration, the API gateway knows where the request should be routed. For one request, the service name is monolith at the beginning and when migration is done, it will be changed to micro-service. As a result, only a small change is required in the central API registry configuration and the routing is transferred transparently without changes on the consumer side.

Figure 6:
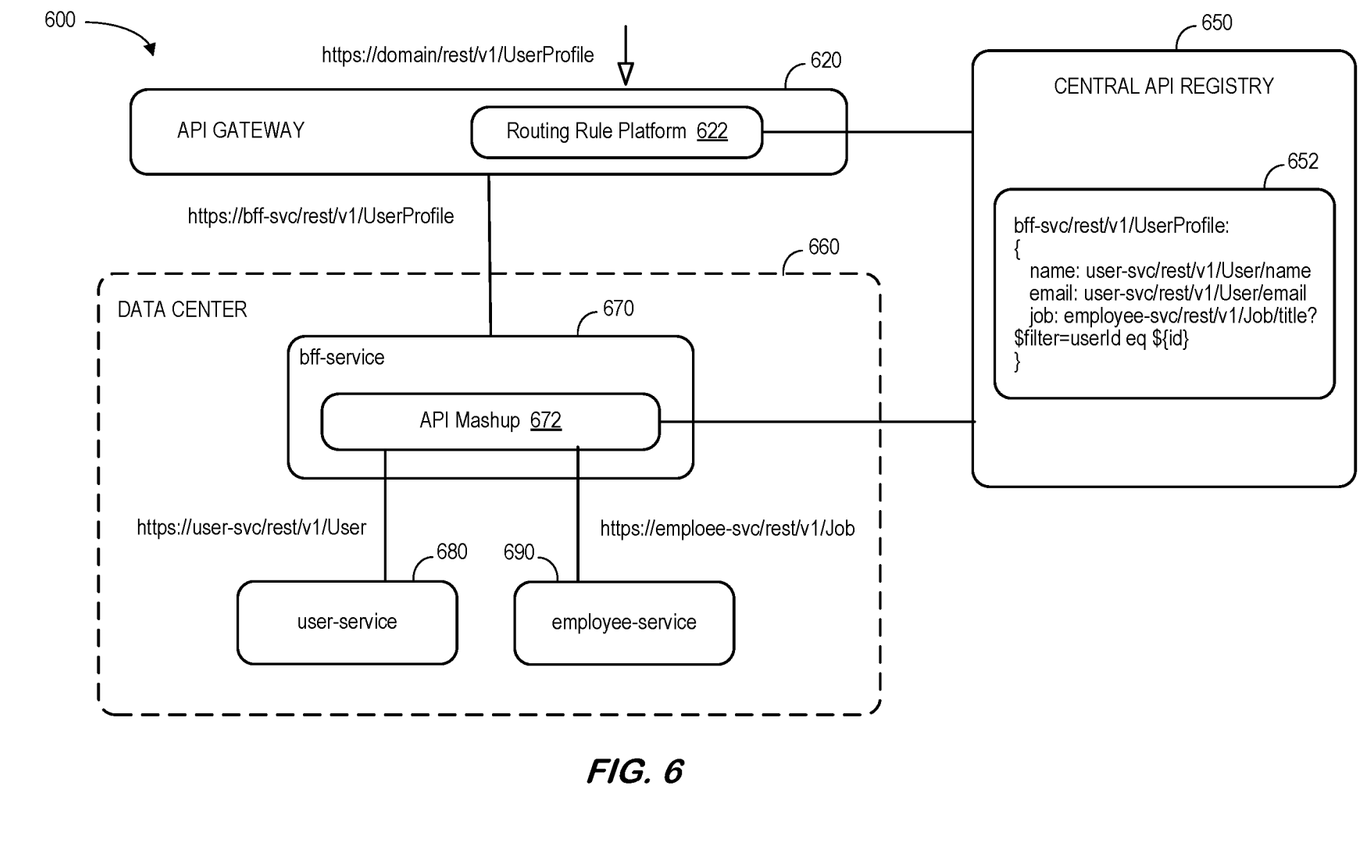
FIG. 6 is a system incorporating Backend For Frontend ("BFF") support according to some embodiments.

Apart from the basic configuration, the central API registry may be enriched with an API mashup for Backend For Frontend ("BFF"). For example, FIG. 6 is a system 600 incorporating BFF support according to some embodiments. As used herein, the phrase "BFF" may refer to, for example, a pattern that uses separate backend services each consumed by specific frontend applications or interfaces. Note that the requirements for one backend may differ substantially from another backend (e.g., due to user interface abilities). These differences can result in competing backend requirements that cause a lot of effort to support. In a BFF approach, different backends are created for different user interfaces and, because each backend is specific to one interface, they can be optimized to be smaller, less complex, and/or faster than a generic backend that satisfies the requirements for all interfaces. Moreover, the phrase "API mashup" may refer to an API that coordinates multiple APIs by categorizing and revealing them as one API for a consumer (and may allow for the generation of multiple methods from different API gateways). The system 600 includes an API gateway 620 (with a routing rule platform 622) and a data center 660 that both access a central API registry 650. The data center 660 includes a bff-service 670 (with an API mashup 672) that communicates with a user-service 680 and an employee-service 690.

Figure 7:
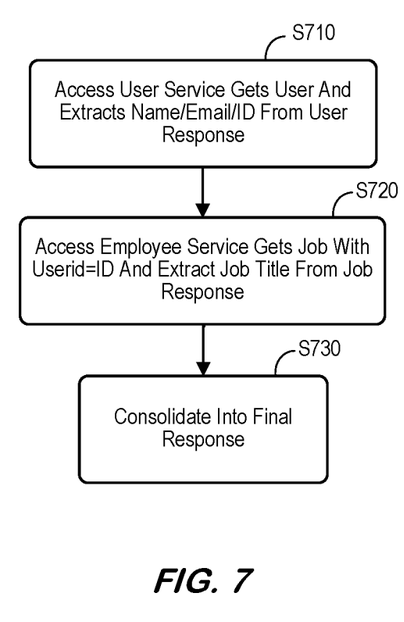
FIG. 7 is a BFF response method in accordance with some embodiments.
Figure 8:
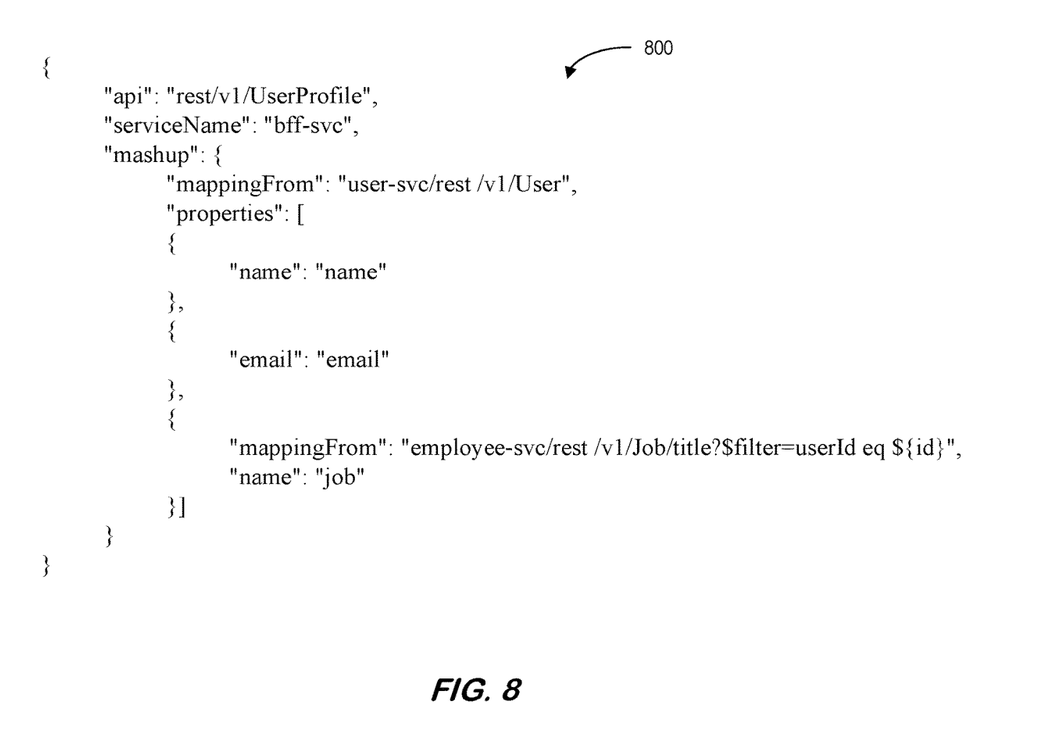
FIG. 8 is a sample configuration supporting an API mashup according to some embodiments.

A mashup definition 652 in the central API registry 650 may operate as follows. When a request "https//domain/rest/v1/UserProfile" reaches the API gateway 620, the API gateway 620 forwards it to BFF layer (e.g., associated with data center 660 or bff-service 670) as "https://bff-svc/rest/v1/UserProfile." The bff-service 670 reads the mashup definition 652 from the central API registry 650 and knows how fields are fetched: (1) the name and email are directly fetched from User in user-service 680; and (2) the job title is fetched from Job in employee-service 690 with the join condition Job.userId=User.id. FIG. 7 is a BFF response method in accordance with some embodiments. At S710, the system may access user-service 680 to get the User and extract the name/email/id from the User response. At S720, the system may access employee-service 690 to get Job with filter userId=id (from S710) and extract the title from the Job response. The system may then consolidate the data from S710 and S720 into a final response at S730. In this way, complicated User Interface ("UI") queries may be simplified into one query. A user or client sends only one request but retrieves data from multiple different services with the support of the API mashup in the central API registry 650. In addition, modifications may be made to the backend (e.g., additional microservices may be edited, added, or removed) without needing to have the user modify the original request. Such backend changes are now managed by the central API registry 650. FIG. 8 is a sample configuration 800 supporting an API mashup according to some embodiments.

Figure 9:
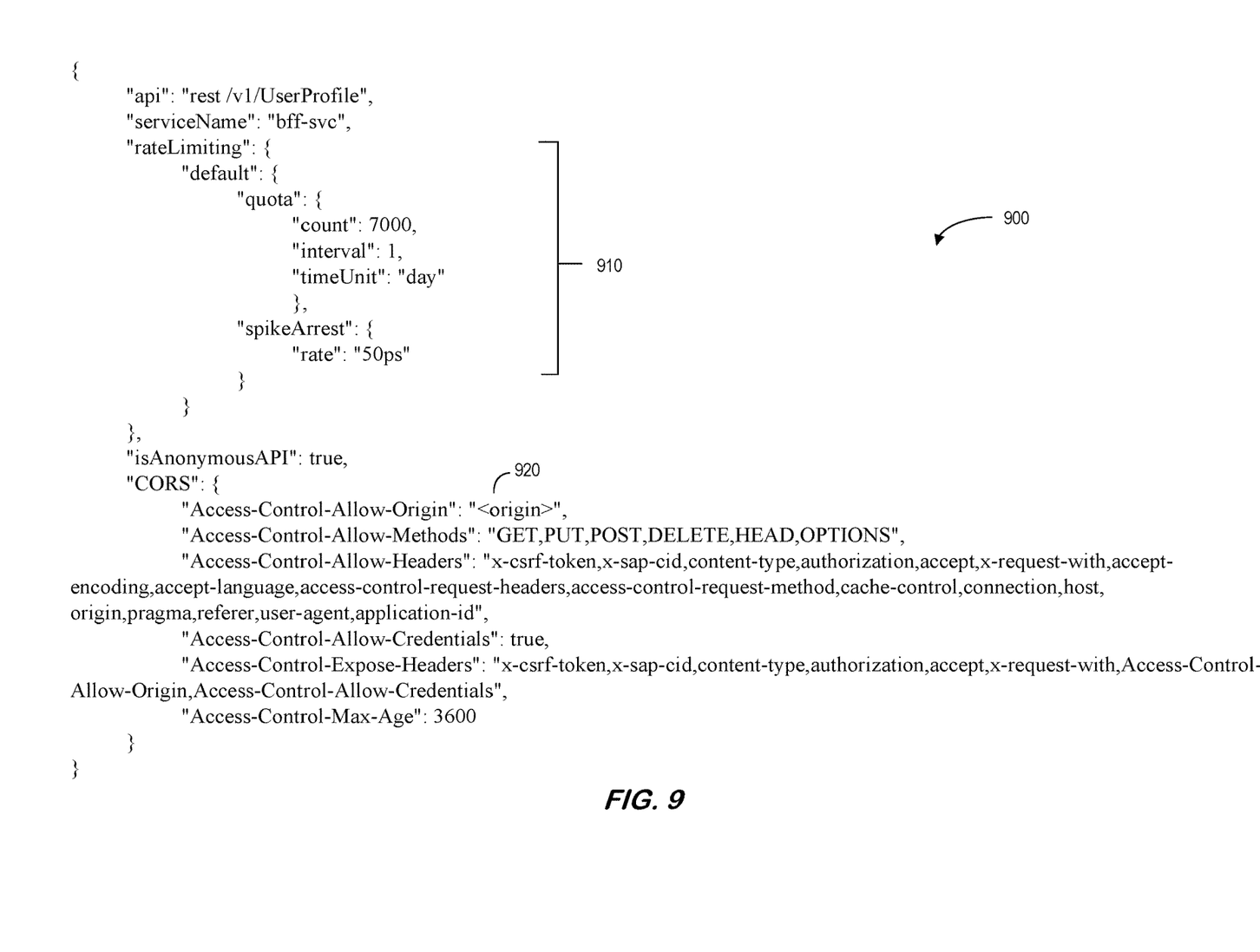
FIG. 9 is a sample configuration showing other extensibilities in accordance with some embodiments.

Note that other extensibilities may be associated with the central API registry 650. Examples of other API configurations that might be put into the central API registry include CORS, rate limiting, etc. Centralizing configuration in a single place makes it more convenient to change all configurations and reduces the risk that some configurations will mistakenly remain non-updated. FIG. 9 is a sample configuration 900 showing other extensibilities in accordance with some embodiments. In particular, the sample configuration 900 includes rate limiting logic 910 and CORS logic 920. As used herein, the phrase "CORS" may refer to a mechanism that lets resources on a web page be accessed from another domain (outside the domain from which the resource was initially served).

Figure 10:
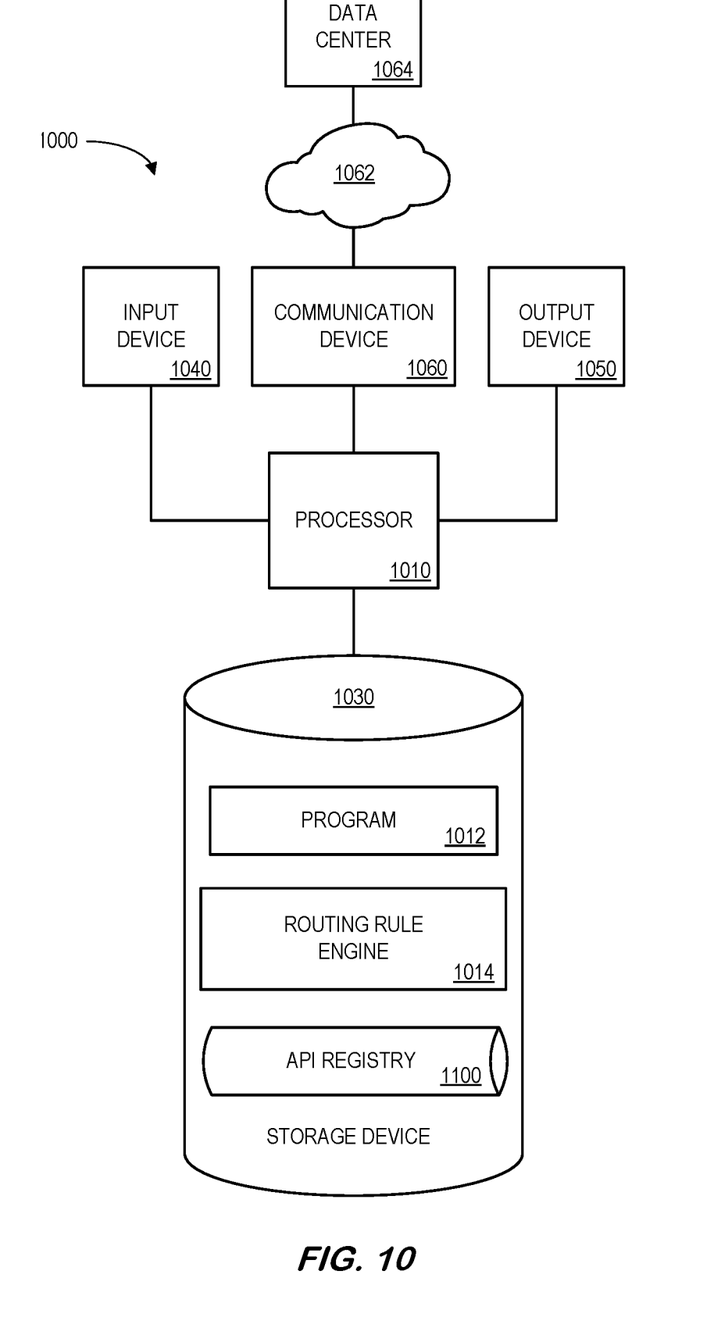
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 300 of FIG. 3 (and/or any other system described herein). The platform 1000 comprises a processor 1010, such as one or more commercially available Central Processing Units ("CPUs") in the form of one-chip microprocessors, coupled to a communication device 1060 configured to communicate via a communication network 1062. The communication device 1060 may be used to communicate, for example, with one or more data centers 1064, administrator platforms, etc. The platform 1000 further includes an input device 1040 (e.g., a computer mouse and/or keyboard to input routing logic, load balancing information, etc.) and/an output device 1050 (e.g., a computer monitor to render a display, transmit recommendations and alerts, and/or create reports about a migration status, etc.).

Figure 11:
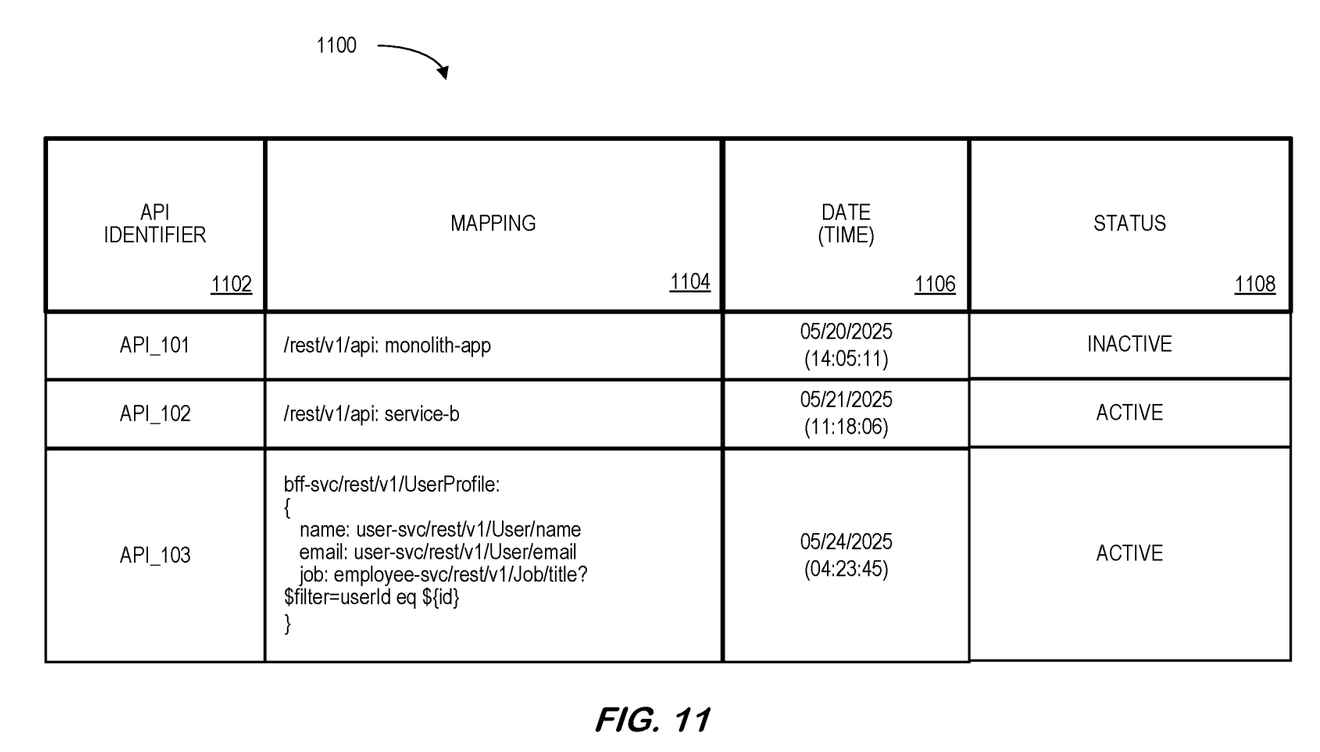
FIG. 11 is portion of a tabular API registry in accordance with some embodiments.

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or routing rule engine 1014 for controlling the processor 1010. The processor 1010 performs instructions of the programs 1012, 1014, and thereby operates in accordance with any of the embodiments described herein. For example, the processor 1010 may receive a request for a user API call (including a request API URL). The request may be received, for example, via a web browser, a mobile interface, an external integration client, etc. Based on the received request API URL, the processor 1010 may query a central API registry 1100 to determine an associated application for the request (e.g., a monolith application or a microservice at a data center). The processor 1010 may then route the request to an appropriate instance of the associated application to process the user API call. According to some embodiments, a microservice in a data center also leverages the mapping in the central API registry 1100.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores the API registry 1100. An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Referring to FIG. 11, a table is shown that represents the API registry 1100 that may be stored at the platform 1000 according to some embodiments. The table may include, for example, entries identifying API configurations for an enterprise microservice cloud computing environment. The table may also define fields 1102, 1104, 1106, 1108 for each of the entries. The fields 1102, 1104, 1106, 1108 may, according to some embodiments, specify: an API identifier 1102, mapping 1104, a date and time 1106, and a status 1108. The API registry 1100 may be created and updated, for example, when a new configuration is defined, an existing configuration is adjusted, etc.

The API identifier 1102 might be a unique alphanumeric label that is associated with a particular API configuration that has been defined by an operator or administrator associated with an enterprise microservice cloud computing environment. The mapping 1104 might define how an API URL pattern maps to an appropriate application. The date and time 1106 may indicate when the configuration was first established, when it last updated, etc. The status 1110 might indicate that a configuration is currently active, has been made inactive, etc.

In this way, embodiments may provide for the abstraction of API request routing rules. Moreover, the system may be API gateway implementation agnostic. Such an approach may help make API migration from a monolith application to one or more microservices transparent. In addition, embodiments may provide for the flexible extensibility of the API definition, including rate-limiting, BFF, API mashups, CORS logic, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
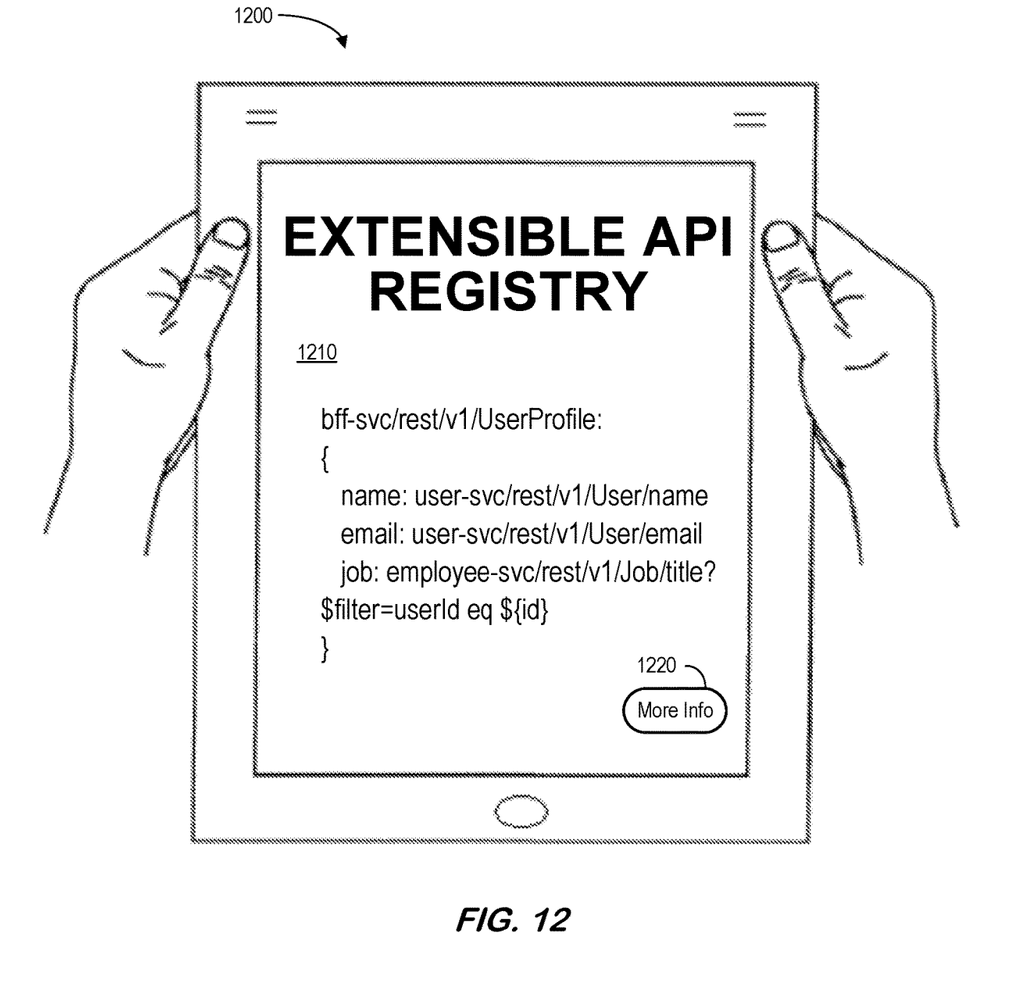
FIG. 12 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of API configurations and services, any of the embodiments described herein could be applied to other types of API configurations and services. Moreover, the displays shown herein are provided only as examples, and any other type of user interface could be implemented. For example, FIG. 12 illustrates a tablet computer 1200 providing extensible API registry information 1210 for a routing rule processor. The extensible API registry information might be used, for example, to view and/or modify aspects of API call routing rules via selection of a "More Info" icon 1220.

Figure 13:
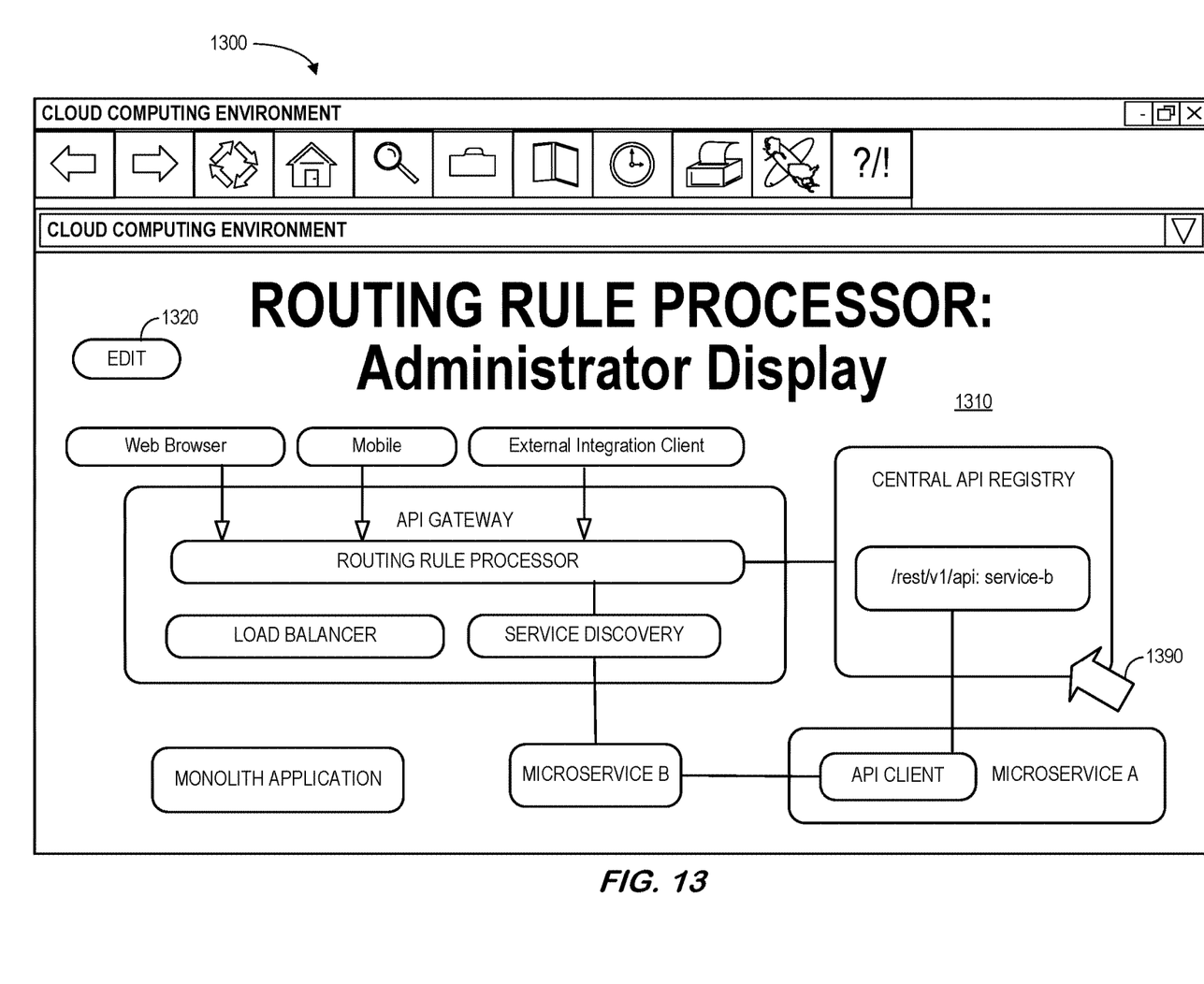
FIG. 13 is an operator or administrator display in accordance with some embodiments.

FIG. 13 is an operator or administrator display in accordance with some embodiments. The display 1300 includes a graphical representation 1310 of a routing rule processor system in accordance with any of the embodiments described herein. Selection of an element on the display 1300 (e.g., via a touchscreen or computer pointer 1390) may result in display of a pop-up window containing more detailed information about that element and/or various options (e.g., to define how a routing rule processor interacts with an enterprise microservice cloud computing environment, etc.). Selection of an "Edit" icon 1320 may also let an operator or administrator adjust the operation of the system (e.g., to change existing mappings to an API registry, add or remove application and/or microservices from the system, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with an enterprise microservice cloud computing environment, comprising:
   a central Application Programming Interface ("API") registry that contains API Uniform Resource Locator ("URL") pattern-to-application mapping; and
   a routing rule processor of an API gateway, coupled to the central API registry, including:
      a computer processor, and
      a computer memory storing instructions that when executed by the computer processor cause the routing rule processor to:
         receive, from an external integration client, a first request for a first API call, the first request including a first request API URL,
         based on the first received request API URL, query the central API registry to determine an associated monolithic application instance of an enterprise application for processing the first request,
         route at least a first portion of the first request to the monolithic application instance to process the first API call,
         receive, from a requesting microservice application instance, a second request for a second API call, the second request including a second request API URL,
         based on the second received request API URL, query the central API registry to determine an associated microservice application instance of the enterprise application for processing the second request, and
         route at least a second portion of the second request, to the determined microservice application instance that was determined to process the second request, to process the second API call.

2. The system of claim 1, wherein the first request occurs at a first time, the second request occurs at a second time, and the second time is after the first time.

3. The system of claim 1, wherein execution of the instructions further cause the routing rule processor to:
   based on one of the received request API URLs, query the central API registry to determine an additional application instance of the enterprise application, and route at least a third portion of the first request API URL to the additional application instance.

4. The system of claim 3, wherein the additional application instance is a monolithic application instance of the enterprise application.

5. The system of claim 3, wherein the additional application instance is a microservice application instance of the enterprise application.

6. A computer-implemented method associated with an enterprise microservice cloud computing environment, comprising:
  receiving, from an external integration client by a computer processor of an Application Programming Interface ("API") gateway, a first request for a first API call, the first request including a first request API Uniform Resource Locator ("URL");
  based on the first received request API URL, querying central API registry to determine an associated monolithic application instance of an enterprise application for processing the first request, wherein the central API registry contains API URL pattern-to-application mapping;
  routing at least a first portion of the first request to the monolithic application instance to process the first API call;
  receiving, from a requesting microservice application instance, a second request for a second API call, the second request including a second request API URL;
  based on the second received request API URL, querying the central API registry to determine an associated microservice application instance of the enterprise application for processing the second request; and
  routing at least a second portion of the second request, to the determined microservice application instance that was determined to process the second request, to process the second API call.

7. The method of claim 6, wherein the first request occurs at a first time, the second request occurs at a second time, and the second time is after the first time.

8. The method of claim 6, further comprising:
  based on one of the received request API URLs, querying the central API registry to determine an associated additional application instance of the enterprise application; and
  routing at least a third portion of the first request API URL to the additional application instance.

9. The method of claim 8, wherein the additional application instance is a monolithic application instance of the enterprise application.

10. The method of claim 8, wherein the additional application instance is a microservice application instance of the enterprise application.

11. A non-transitory, machine-readable medium comprising instructions thereon that, when executed by a processor, cause the processor to execute operations to perform a method associated with an enterprise microservice cloud computing environment, the method comprising:
  receiving, from an external integration client by a computer processor of an Application Programming Interface ("API") gateway, a first request for a first API call, the first request including a first request API Uniform Resource Locator ("URL");
  based on the first received request API URL, querying central API registry to determine an associated monolithic application instance of an enterprise application for processing the first request, wherein the central API registry contains API URL pattern-to-application mapping;
  routing at least a first portion of the first request to the monolithic application instance to process the first API call;
  receiving, from a requesting microservice application instance, a second request for a second API call, the second request including a second request API URL;
  based on the second received request API URL, querying the central API registry to determine an associated microservice application instance of the enterprise application for processing the second request; and
  routing at least a second portion of the second request, to the microservice application instance that was determined to process the second request, to process the second API call.

12. The medium of claim 11, wherein the first request occurs at a first time, the second request occurs at a second time, and the second time is after the first time.

13. The medium of claim 11, further comprising:
  based on one of the received request API URLs, querying the central API registry to determine an associated additional application instance of the enterprise application; and
  routing at least a third portion of the first request API URL to the additional application instance.

14. The medium of claim 13, wherein the additional application instance is a monolithic application instance of the enterprise application.

15. The medium of claim 13, wherein the additional application instance is a microservice application instance of the enterprise application.

* * * * *